March 24, 1942.   M. J. N. DE MARGITTA   2,277,482
PHOTOFLASH LAMP
Filed Jan. 26, 1940
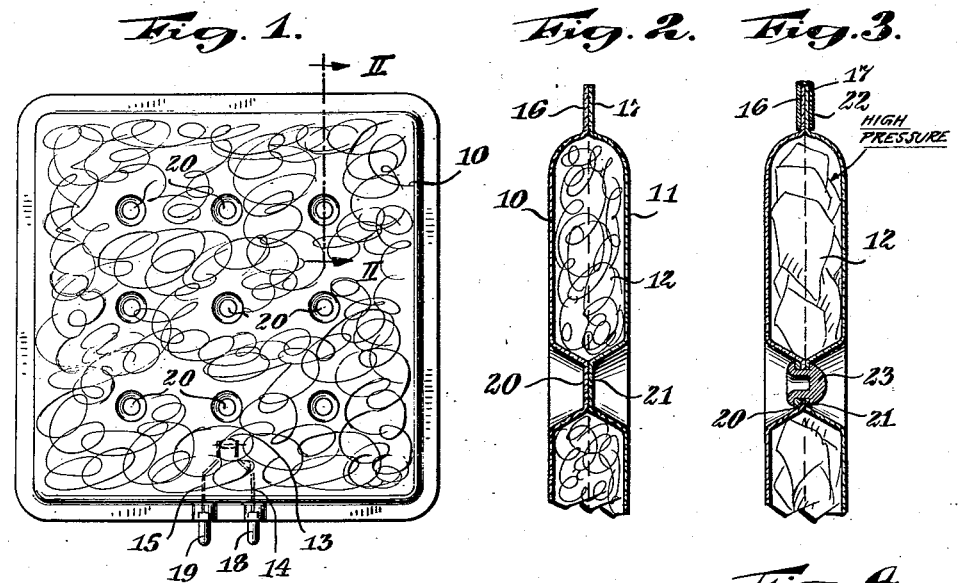
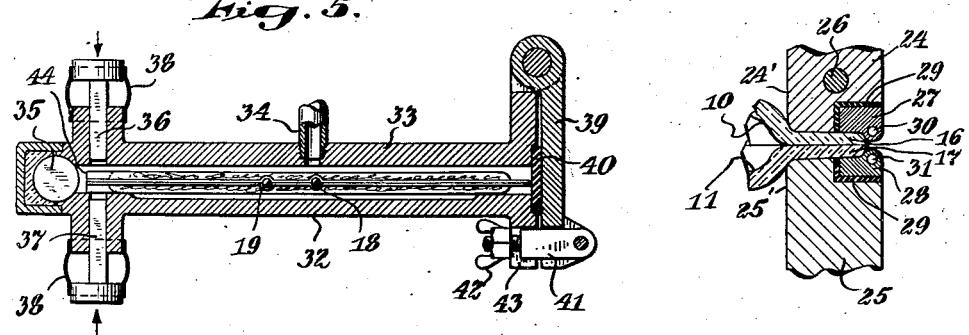
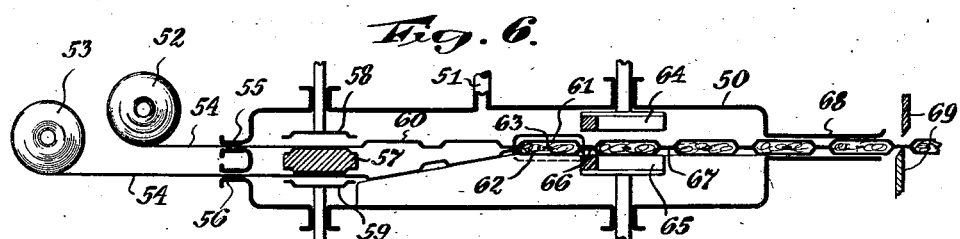
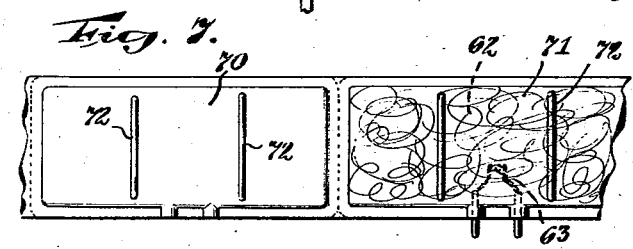
INVENTOR
M. J. NEUMANN DE MARGITTA.
BY
ATTORNEY Patented Mar. 24, 1942

2,277,482

UNITED STATES PATENT OFFICE 2,277,482

PHOTOFLASH LAMP

Michael J. Neumann de Margitta, New York, N. Y., assignor to Westinghouse Electric & Manufacturing Company, East Pittsburgh, Pa., a corporation of Pennsylvania Application January 26, 1940, Serial No. 315,741

7 Claims. (Cl. 67—31)

This application is a continuation in part of my prior applications for improvements in Flashlamps, Serial No. 298,276, filed Oct. 6, 1939, and Serial No. 302,023, filed Oct. 30, 1939.

The invention relates to lamps and especially to photographic flashlamps.

An object of the invention is to provide an easily assembled container for a flashlamp that will not present a danger of broken glass in the transportation, use or disposal thereof.

Another object of the invention is to provide a flashlamp that can be easily transported in quantity and not be damaged by occasional jolts and jars.

Another object of the invention is to provide a method for assembling flashlamps in quantity without expensive apparatus.

Other objects and advantages of the invention will be apparent from the following description and drawing, in which:

Fig. 1 is a front elevation of a preferred embodiment of my flashlamp.

Fig. 2 is an enlarged cross-sectional view on lines II—II of Fig. 1.

Fig. 3 is an enlarged cross-sectional view of a modification of the disclosure in Fig. 2.

Fig. 4 is a cross-sectional view through means for welding the edges of the lamp.

Fig. 5 is a cross-sectional view through apparatus for sealing the flashlamp of Fig. 1.

Fig. 6 is a cross-sectional view through a preferred apparatus for making flashlamps similar to Fig. 1 in quantity.

Fig. 7 is a top elevation of a portion of the lamp strips of Fig. 6.

My invention concerns a flashlamp, and it is a special object of my invention to provide a flashlamp that can withstand the jolts and jars such as it would be subject to in a man's coat pocket. Furthermore, it is another special object of my invention to provide a form of casing whereby several flashlamps may be carried in such a pocket without unusual bulk.

I obtain these objects specifically by forming the casing of my flashlamp from a plastic material, especially cellulose acetate. While cellulose acetate is my preferred plastic, yet I may also use the transparent or translucent plastics of the various resins, such as urea-formaldehyde and phenol-formaldehyde, as well as plastics of casein, pyroxylin, shellac, or rubber. Treated paper may also be used in whole or in part for the casing.

In Fig. 1 I have disclosed a flat type lamp which is convenient for transportation and use, especially where a number of flashlamps must always be available. This flashlamp comprises two dish-like members 10 and 11, containing between their surfaces a combustible material 12, such as a film or fine wires of aluminum or magnesium, and an igniting element 13, which element may be a filament surrounded by a powder of zirconium, aluminum or phosphorus powder. Two conductors 14 and 15 provide means for connecting an electric current to flash the combustible material.

The flashlamp is sealed by having the two peripheral edges 16 and 17 cemented or welded together. The two conductors 14 and 15 have two exterior leads 18 and 19 sealed through one or more sides of the flashlamp, and preferably one side as disclosed.

I prefer to indent the two sides 10 and 11 at a plurality of places, so that an area 20 of the side 10 is connected to a similar area 21 of the other side of the lamp. These indentations not only strengthen the casing but also prevent the combustible material from bunching in one portion of the casing. Sufficient heat or pressure applied at these portions weld or stick these two sides together to maintain the lamp in its desired shape and form.

The casing has a combustion supporting gas, such as oxygen, therein at, below or above atmospheric pressure. In case the pressure desired is above atmospheric pressure, I prefer to bind the peripheral edges 16 and 17 with a metal clamp 22 and to insert metal eyelets 23 through the areas of the indented portions 20 and 21 as disclosed in Fig. 3.

In Fig. 4 I have disclosed simple apparatus whereby the flashlamp casing may be prepared for the final sealing. The two sheets 10 and 11 have an edge inserted between two jaws 24 and 25 illustrated, and the lower jaw 25 may be fixed and the upper jaw pivoted on a shaft 26.

The welding part comprises an insert material 27 and 28 in these two jaws, insulated from the remaining parts by insulation 29. This material 27 is of good heat-conducting material such as copper, although various other metals might be used. Through this material are passageways 30 and 31 containing a heating means, such as an electric wire or a passageway for steam. The peripheral edges 16 and 17 of the plastic material are welded into a homogeneous mass by the pressure and heat exerted by jaws 24 and 25. The near sides 24' and 25' are relatively cool and keep a grip on the plastic material which may be rather fluid between the jaws 27 and 28.

After the three edges of the lamp are welded about the combustible material and igniting means, the lamp is preferably inserted in a device, such as that illustrated in Fig. 5. This device comprises a bed-plate 32 and an upper plate 33 clamped tightly together with a central space therebetween slightly larger than the volume occupied by the lamp. A port 34 extends through one of these plates, such as the upper one. At the further end is a heater 35, such as a passageway for steam or the wire of an electric heater. This is located adjacent the open end of the lamp. Also at this place are two arms 36 and 37 extending through the casing in a position to clamp together the open end of the lamp adjacent the heater. Well-known means, such as bellows 38, provide means for moving the arms 36 and 37 without the admission of atmosphere to the interior of the casing.

The front portion of the casing has preferably a swinging door 39 with compressible material 40, such as rubber, attached thereto, for making an air-tight closure of the two plates 32 and 33 by means of a lock lever 41, secured by a wing nut 42 to projecting lugs 43 of the casing.

The port 34 is connected to an exhausting machine and after the air has been exhausted from the casing, oxygen is applied to the casing at the desired pressure for filling the plastic lamp through open side 44. After oxygen has entered the plastic lamp, the arms 36 and 37 clamp the remaining open periphery of the lamp, the heater 35 is actuated and the remaining side is sealed. The heat is then turned off and the sealed lamp removed from the casing.

For quantity production I preferably provide the apparatus illustrated in Fig. 6. This comprises the compartment 50, having an oxygen supply applied thereto through a port 51. Two rolls 52 and 53 of flat ribbon plastic material feed through two adjacent openings 55 and 56 of the casing. These ribbons pass on opposite sides of the former 57 having the desired interior contour of the finished lamp on its opposite sides. Two dies 58 and 59 clamp down upon the plastic ribbon and mold it into the desired shape by means of the pressure. These dies may be slightly heated if desired. The dies are then lifted until the formed ribbon passes to the next position, illustrated at 60, when the dies are again actuated. The two ribbons are directed toward one another and at position 61, the combustible material 62 and the igniting means 63 are inserted from the side of the ribbons. This may be done by hand through mechanical connections sealed through the casing, but is preferably made automatic by utilizing any of the suitable arrangements used in packing food, etc. in organic containers. The ribbons then pass through the heated jaws 64 and 65, which weld the two outside edges of the ribbon and also an indented transverse portion 66, which seals the lamp, the transverse portion 67 at the forward end of the lamp having been welded when the prior lamp was sealed. The lamp, in continuous ribbon form, passes through an outlet 68 of the casing, where the intermediate portions between the lamps are sheared off by means of knives 69.

In Fig. 7 I have disclosed an enlarged view of a portion of the ribbon, showing a portion 70 just prior to being filled with the combustible material and igniting device, and also an adjacent portion 71, disclosing the combustible material and igniting device inserted therein. The dies 58 and 59, with the former 57, can place strengthening ribs 72 in the lamp sides if desired.

The plastic ribbon on the rolls 52 and 53 may be already shaped as disclosed at 60 or 70 and the operation within the casing 50 limited to the filling and sealing operation. The indentations 20 and 21 of Fig. 2 may be formed by the jaws 64 and 65 and the rivets 23 of Fig. 3 added within the casing of Fig. 6 or afterwards.

The shape of the casings in Figs. 1, 2, and 3 with their indentations corresponds with that of the familiar waffle and the application of the term "waffle-shape" to these figures clearly visualizes to those skilled in the art the indented sides of the casing. Such a shape, as previously mentioned, could be produced by the apparatus in Fig. 6.

The lamp disclosed in my drawing is obviously a very convenient one to handle in comparison with the present glass casing bulb of the commercial flashlamp. The particular materials and formation of the casing provide, however, a sufficiently strong casing for the operation of the device and yet one which is simply and cheaply manufactured.

It is apparent, however, that various modifications can be made in the form of the device and the apparatus for manufacturing it, and also in the steps of assembly specifically disclosed herein. Accordingly, I desire only such limitations to be made upon the invention as are necessitated by the spirit and scope of the following claims.

I claim:

1. A flashlamp comprising two dish-shaped sections of light transmitting plastic material welded around the edges to one another, a filling of combustible material, an igniting device between said sections, and conductors for the igniting device sealed through the welded edges of the sections, said sections being welded together at places intermediate the welded edges.

2. The method of forming photoflash lamps which comprises feeding two plastic ribbons into a compartment having a combustion supporting gas therein, stamping complementary sections from said two ribbons concurrently, inserting combustible material and an igniting device between the complementary sections and welding the edges of the complementary sections together.

3. A flashlamp comprising a casing having an igniting device therein, combustible material and a combustion-supporting gas intimately interspersed with said material within said casing, said casing having dish-shaped sides of light transmitting organic material sealed at edges thereof, and said sides having indentations spaced from said edges, said indentations of each side being fastened to an opposing part of the other side.

4. A flashlamp comprising a casing having an igniting device therein, combustible material and a combustion-supporting gas intimately interspersed with said material within said casing, said casing having dish-shaped sides of light transmitting organic material with peripheral edges thereof secured together with a pressure-resisting seal, and said sides having means encircled by said material and gas for reenforcing said sides one from the other at surface portions spaced from said peripheral edges.

5. A flashlamp comprising two dish-shaped sections of light transmitting plastic material secured peripherally one to the other with a pressure-resisting seal and forming a hollow-body container, a filler in said container comprising combustible material and combustion-supporting gas under pressure intimately interspersed with said material, an igniting device also in said container and intimately associated with both said gas and material, and conductors for the igniting device sealed through the peripherally-secured edges from exterior to interior of said container.

6. A flashlamp comprising two dish-shaped sections of light transmitting plastic material secured peripherally one to the other with a pressure-resisting seal and forming a hollow-body container, means spaced from the peripheries of the said sections reenforcing one section from the other at mid-parts of said sections, a filler in said container comprising combustible material and combustion-supporting gas under pressure intimately interspersed with said material, an igniting device also in said container and intimately associated with both said gas and material, and conductors for the igniting device sealed through from exterior to interior of said container.

7. A flashlamp comprising two dish-shaped sections of light transmitting plastic material secured peripherally one to the other with a pressure-resisting seal and forming a hollow-body container, said sections having opposed indentations at mid-parts thereof spaced from the peripheries with the indentations of one section engaging and secured to the indentations of the other section, a filler in said container comprising combustible material and combustion-supporting gas under pressure intimately interspersed with said material, an igniting device also in said container and intimately associated with both said gas and material, and conductors for the igniting device sealed through from exterior to interior of said container.

MICHAEL J. NEUMANN DE MARGITTA.